(12) United States Patent
Watanabe et al.

(10) Patent No.: US 7,127,657 B2
(45) Date of Patent: Oct. 24, 2006

(54) SYSTEM AND METHOD FOR PROCESSING DIGITAL DATA WHILE BUFFERING DIGITAL DATA IN A BUFFER MEMORY

(75) Inventors: Tomofumi Watanabe, Gifu-ken (JP); Yuuichiro Tsukamizu, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 664 days.

(21) Appl. No.: 10/371,843

(22) Filed: Feb. 20, 2003

(65) Prior Publication Data
US 2003/0159091 A1    Aug. 21, 2003

(30) Foreign Application Priority Data
Feb. 21, 2002    (JP) ............... 2002-044422

(51) Int. Cl.
*H03M 13/29*    (2006.01)
*G11C 29/52*    (2006.01)
(52) U.S. Cl. ............ 714/755; 714/756; 714/769
(58) Field of Classification Search ........ 714/755–756, 714/769
See application file for complete search history.

(56) References Cited
U.S. PATENT DOCUMENTS
6,119,260 A * 9/2000 Tomisawa et al. .......... 714/758
2002/0062469 A1 * 5/2002 Shieh et al. .............. 714/769
2004/0098661 A1 * 5/2004 Chuang et al. ........... 714/784

FOREIGN PATENT DOCUMENTS
WO    WO 9948097 A1 * 9/1999

OTHER PUBLICATIONS
Lee, P.; Chang, S.; Parallel error-trapping and error-detection decoding; Signals, Systems and Computers, 1991. 1991 Conference Record of the Twenty-Fifth Asilomar Conference on☐☐Nov. 4-6, 1991 pp. 35-38 vol.*

* cited by examiner

*Primary Examiner*—R. Stephen Dildine
(74) *Attorney, Agent, or Firm*—Fish & Richardson P.C.

(57) ABSTRACT

A CD-ROM decoder for processing digital data while buffering the digital data in a buffer RAM. The CD-ROM decoder includes a host interface for storing the digital data in the buffer RAM. An EDC processing circuit generates an error detection code using the digital data read from the buffer RAM in a block unit. An ECC processing circuit generates an error correction code with the digital data and the error detection code. An internal RAM stores the digital data and adds the error detection code and the error correction code to the digital data when storing the digital data. A digital signal processor outputs the digital data, the error detection code, and the error correction code that are stored in the internal RAM in a block unit.

11 Claims, 7 Drawing Sheets

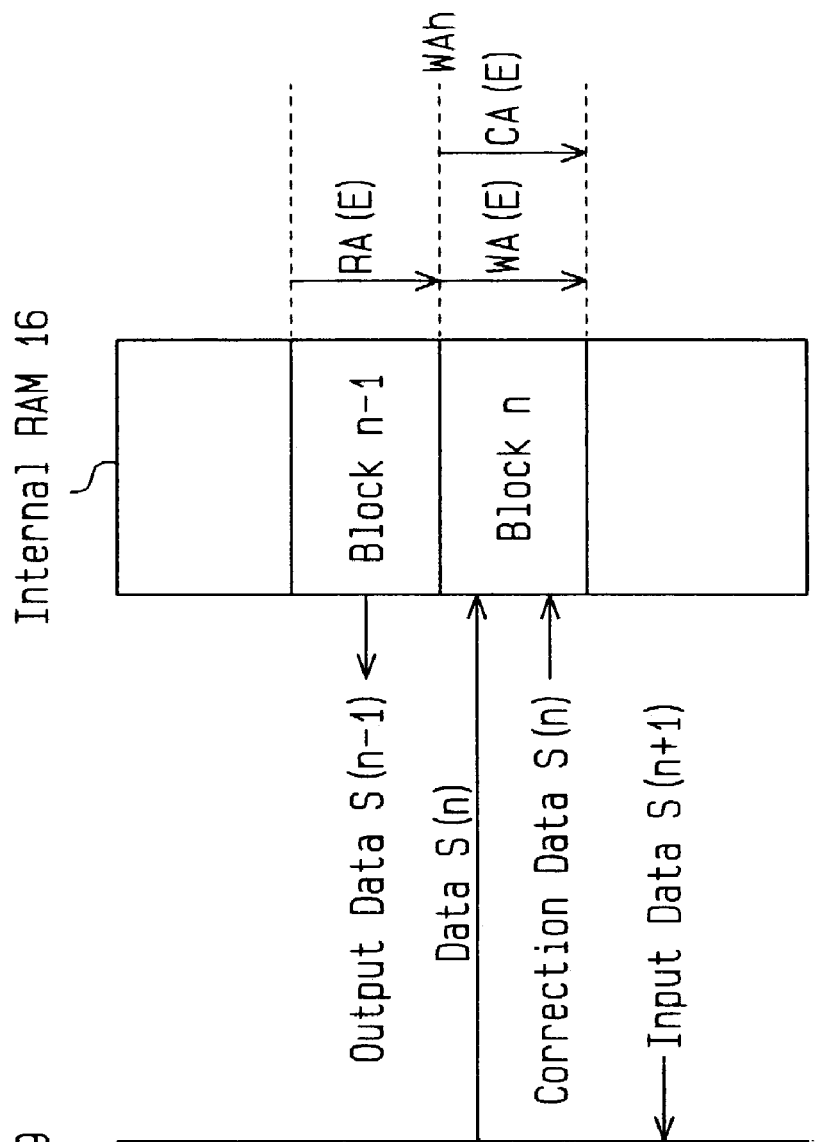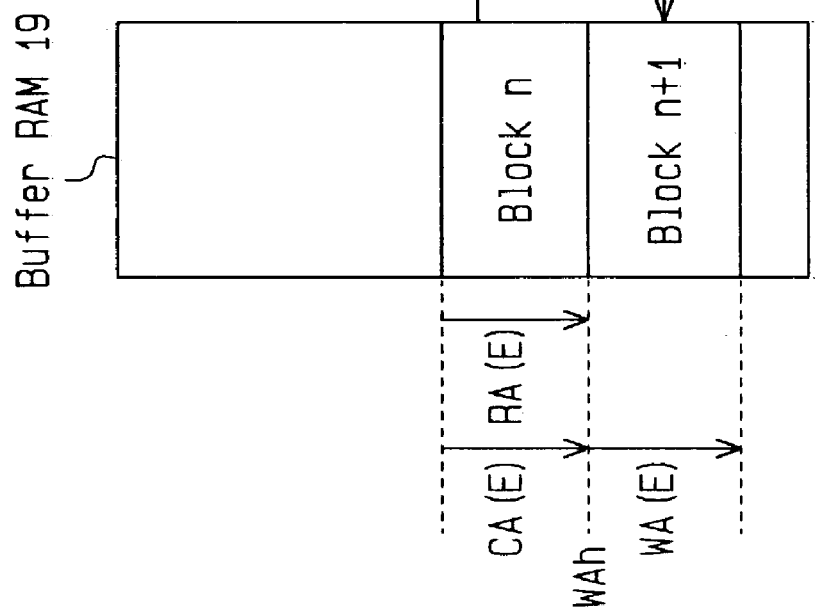

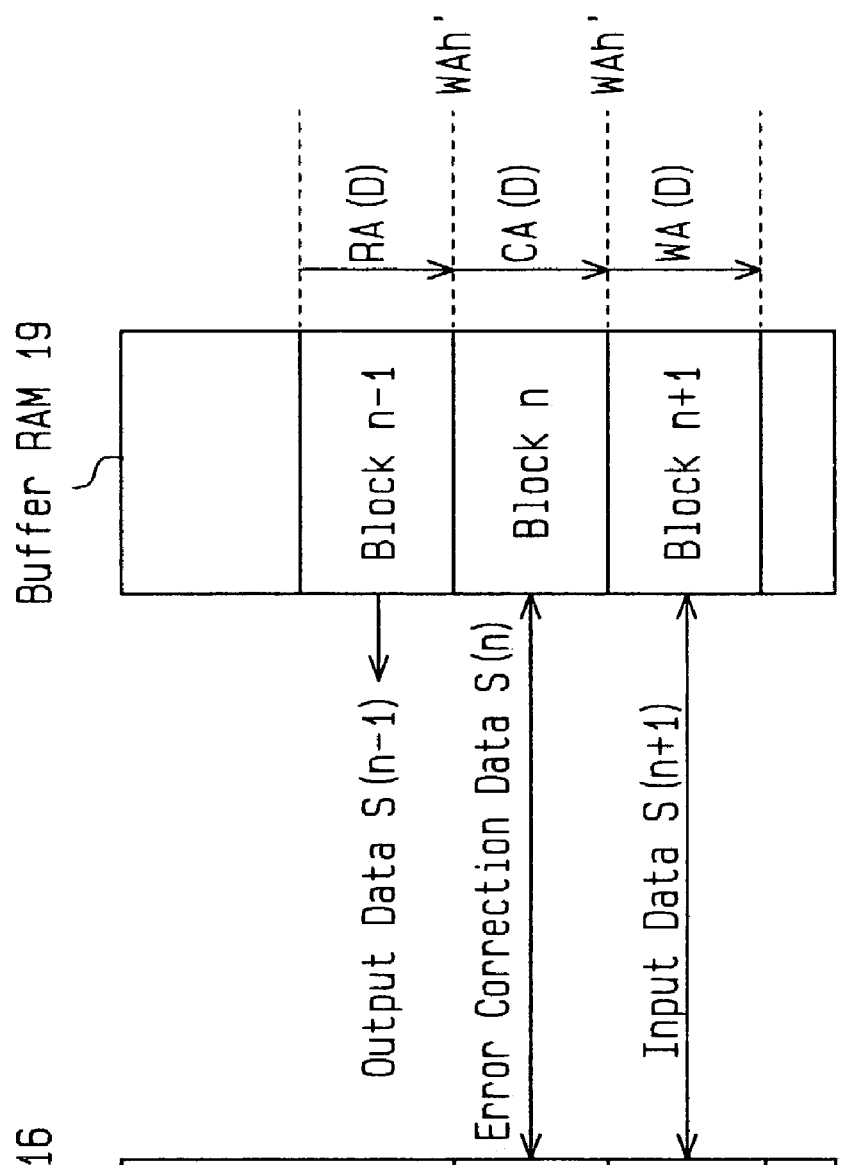

SYSTEM AND METHOD FOR PROCESSING DIGITAL DATA WHILE BUFFERING DIGITAL DATA IN A BUFFER MEMORY

CROSS-REFERENCE TO RELATED APPLICATIONS

This application is based upon and claims the benefit of priority from the prior Japanese Patent Application No. 2002-044422, filed on Feb. 21, 2002, the entire contents of which are incorporated herein by reference.

BACKGROUND OF THE INVENTION

The present invention relates to a data processor, and more particularly, to an error correction processor for adding an error detection code and an error correction code to digital data when recording the digital data, which is in a predetermined format and output from a host computer, on a recording medium, such as a CD-Recordable (CD-R) or CD-Rewritable (CD-RW) disc.

An optical disc recorder, which functions as a data recorder, is known in the prior art to record data on an optical disc, which is a recording medium. An example of such an optical disc recorder is a CD-R/RW drive that uses a CD-R disc, to which data may be written only once, or a CD-RW disc, to which data may be written repetitively. In a CD-R/RW system, an error detection code (EDC) and an error correction code (ECC) are added to the recording data to correct code errors when reproducing the data on the disc.

Referring to FIG. 1, a prior art CD-R/RW system 100 includes a CD-ROM decoder 1, a digital signal processor 2, an analog signal processor 3, a pickup 4, a pickup controller 6, a buffer RAM 7, and a control microcomputer 8.

The CD-ROM decoder 1 receives 2048 bytes of data from a host computer 120 and adds an error correction code (ECC) and an error detection code (EDC) to the data to generate CD-ROM data. The CD-ROM data includes multiple blocks. As shown in FIG. 2, each block is configured from 2,352 bytes (24 bytes×98 frames). In mode 1, each block includes synchronization data (12 bytes), a header (4 bytes), user data (2,048 bytes), the EDC (4 bytes), a space (8 bytes), and the ECC (276 bytes). In each block, the data excluding the synchronization data (12 bytes), that is, 2,340 bytes of data, undergoes scramble processing. In the CD-ROM decoder 1, an encoding (recording) device is incorporated in a decoding (reproduction) device, which performs an error correction process and error detection process on the CD-ROM data that is read from an optical disc. Further, in the CD-ROM decoder 1, the reproducing system and the recording system are normally combined. The recording system of the CD-R/RW system 100 is described here, but description of the reproducing system is omitted.

The digital signal processor 2 receives the CD-ROM data from the CD-ROM decoder 1 in single frame units (24 bytes), performs a predetermined operation on the CD-ROM data to generate codes C1 and C2 based on a Cross-Interleave Reed-Solomon Code (CJRC), and adds codes C1 and C2 to the CD-ROM data. The digital signal processor 2 interleaves and performs eight to fourteen modulation (EFM) on the CD-ROM data, to which the codes C1 and C2 are added, to generate an analog signal. The analog signal processor 3 receives the analog data from the digital signal processor 2 in a serial manner. Then, the analog signal processor 3 reads changes in the level of the analog data to control the emission of a laser beam from the pickup 4 toward the optical disc 5.

In addition to emitting a laser beam toward the optical disc 5 to read data from the optical disc 5, the pickup 4 records the data encoded by the CD-ROM decoder 1 on the optical disc 5. The optical disc 5 may be, for example, a CD-R disc having a recording layer to which the writing of data is enabled only once or a CD-RW disc having a recording layer to which data may be rewritten a number of times. In the CD-R disc, data is recorded by melting the recording layer, which is formed from organic pigments, with the heat of a high power laser beam and forming pits. In the CD-RW disc, sudden heating with a laser beam and sudden cooling are performed so that an amorphous phase is formed in the recording layer to change the reflectance of light and record data. The pickup controller 6 controls the position of the pickup 4 relative to the optical disc 5 based on the signal read from the optical disc 5.

The buffer RAM 7, which is connected to the CD-ROM decoder 1, temporarily stores the CD-ROM data provided to the CD-ROM decoder 1 from the host computer 120. In the CD-ROM decoder 1, the EDC and ECC are obtained for each block. Further, the obtained EDC and ECC are added to the data of the block. Thus, the CD-ROM decoder 1 requires at least a single block of the CD-ROM data. Accordingly, the buffer RAM 7 stores a single block of the CD-ROM data that is required for the CD-ROM decoder 1 to perform processing.

The control microcomputer 8, which is a one-chip microcomputer having a memory that stores a control program, controls the operation of the CD-ROM decoder 1 in accordance with its control program. Further, the control microcomputer 8 stores command data, which is provided from the host computer 120, in its memory and controls the CD-ROM decoder 1, the digital signal processor 2, the analog signal processor 3, and the pickup controller 6 in accordance with the command from the host computer 120.

While receiving the CD-ROM data from the host computer 120 and providing the CD-ROM data to the digital signal processor 2, the CD-ROM decoder 1 adds the EDC and the ECC to the CD-ROM data. The CD-ROM decoder 1 includes an plurality of circuits including an error correction circuit and an error detection circuit. The processes performed by the error correction and error detection circuits are performed in a sequential manner. Thus, in accordance with each process, the buffer RAM 7 is accessed in a time-divisional manner. In this case, when, for example, error correction is performed, the error correction circuit occupies the access to the buffer RAM 7. However, other processing circuits are also permitted access to the buffer RAM 7 in this state. Accordingly, regardless of how fast error correction or error detection are performed, a certain length of time is required to complete processing in the entire CD-ROM decoder 1. Thus, it is difficult to further increase the processing speed of the CD-ROM decoder 1.

SUMMARY OF THE INVENTION

One aspect of the present is a data processor for processing digital data while buffering the digital data in a buffer memory. The data processor includes a first interface which stores the digital data in the buffer memory. A detection code processing circuit receives the digital data when read from the buffer memory in a block unit and generates an error detection code that is added to the read digital data. A correction code processing circuit generates an error correction code with the digital data and the error detection code. An internal memory circuit stores the digital data, the error detection code and the error correction code while adding the error detection code and the error correction code to the digital data. A second interface outputs the digital data, to which the error detection code and the error correction code are added, stored in the internal memory circuit in a block unit.

A further aspect of the present invention is a method for processing digital data while buffering the digital data in a buffer memory. The method includes storing the digital data in the buffer memory, reading the digital data from the buffer memory in a block unit and generating an error detection code that is added to the read digital data, generating an error correction code with the digital data and the error detection code, storing the digital data, the error detection code and the error correction code in an internal memory circuit while adding the error detection code and the error correction code to the digital data, and outputting the digital data, to which the error detection code and the error correction code are added, stored in the internal memory circuit.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8A and FIG. 8B are schematic diagrams illustrating an example of the state in which a buffer RAM and an internal RAM are used when recording data; and FIG. 9A and FIG. 9B are schematic diagrams illustrating an example of the state in which a buffer RAM and an internal RAM are used when recording data.

Figure 1:
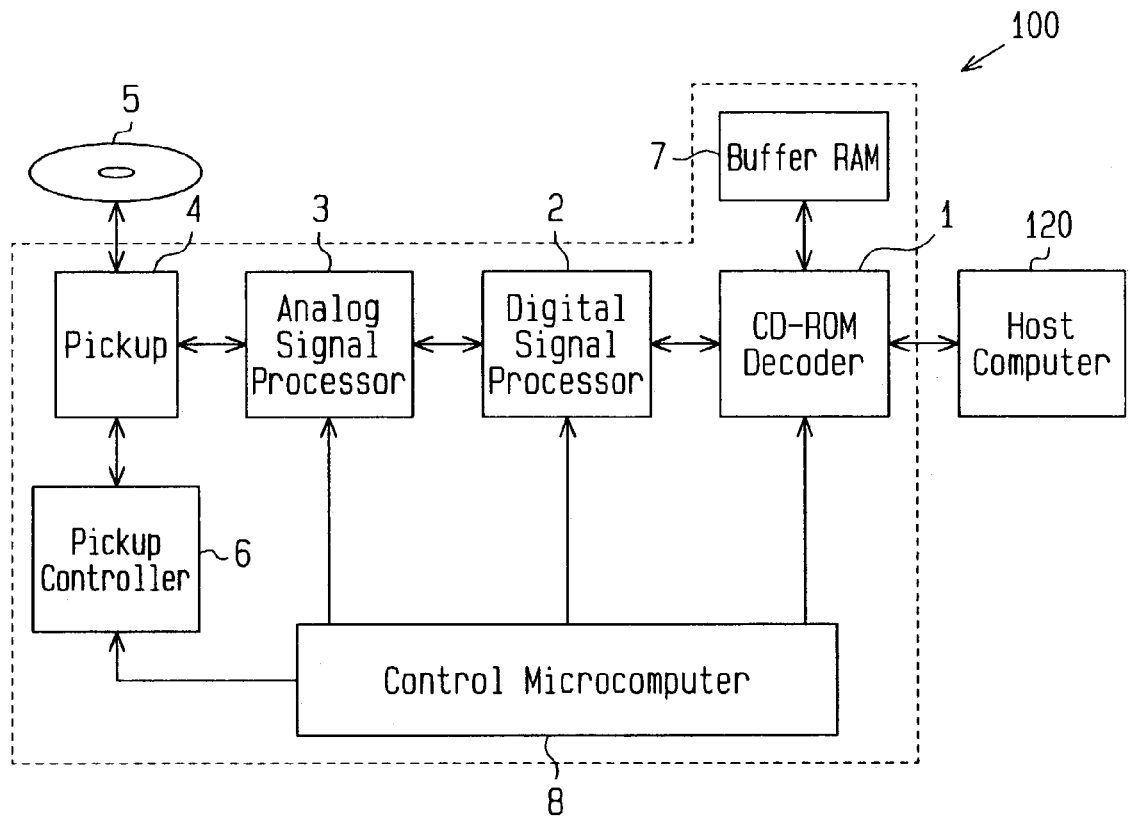
FIG. 1 is a schematic block diagram of a prior art CD-R/RW system.
Figure 2:
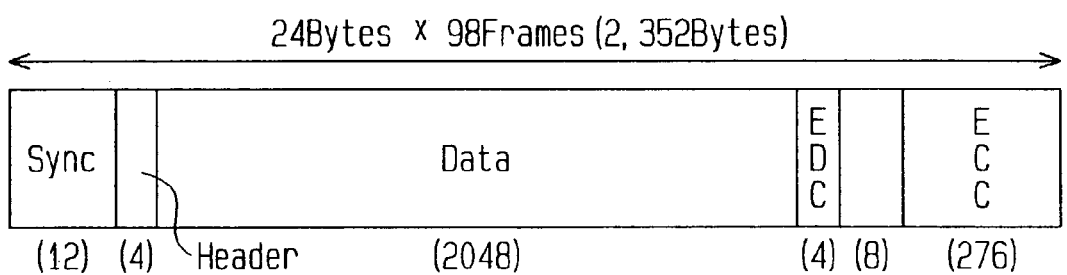
FIG. 2 is a diagram illustrating the format of the CD-ROM data used in the system of FIG. 1.

DETAILED DESCRIPTION OF THE
PREFERRED EMBODIMENTS

In the drawings, like numerals are used for like elements throughout.

Figure 3:
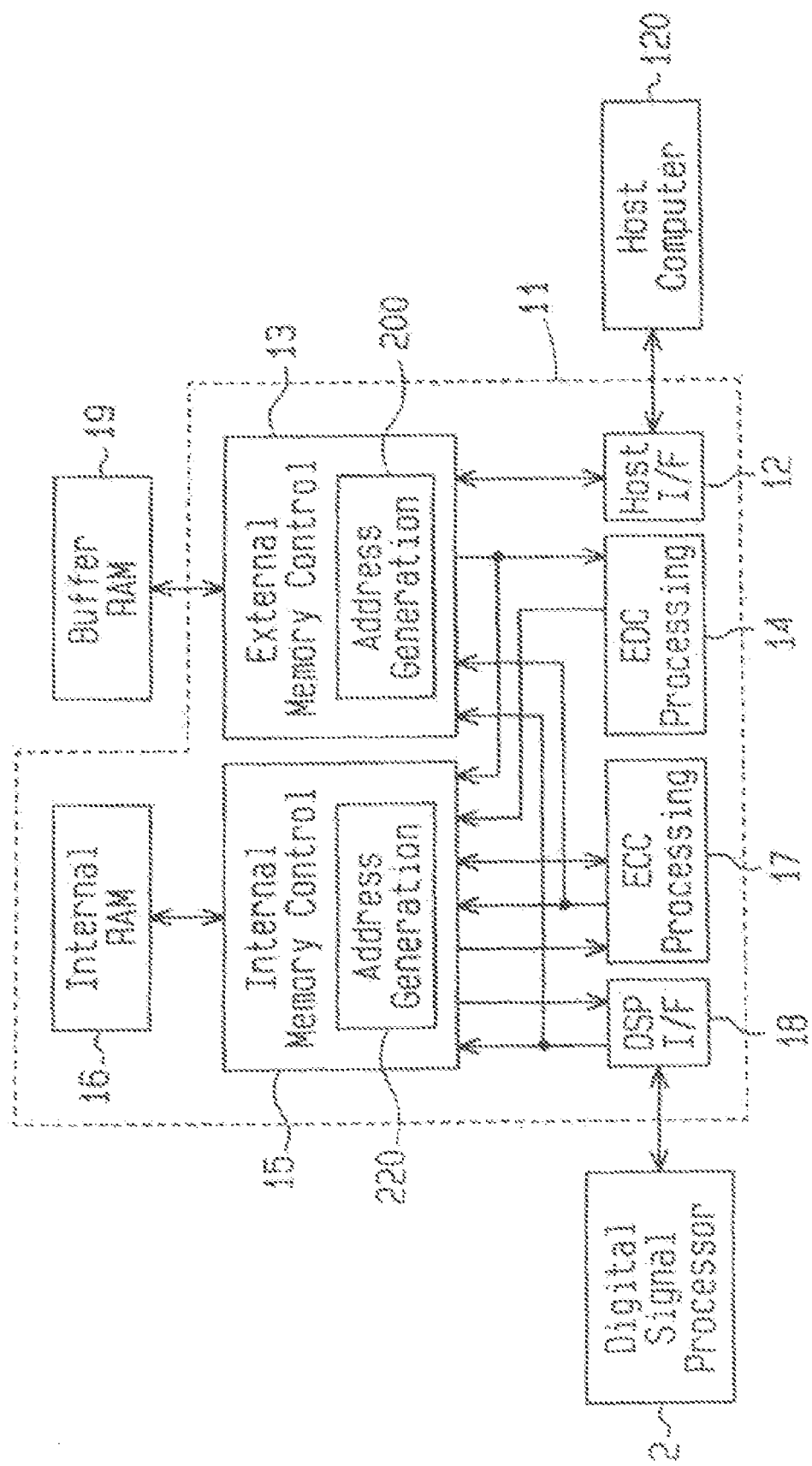
FIG. 3 is a schematic block diagram of a CD-ROM decoder according to a preferred embodiment of the present invention.

FIG. 3 is a schematic block diagram of a CD-ROM decoder 11 according to a preferred embodiment of the present invention. The CD-ROM decoder 11 includes a host interface 12, an external memory control circuit 13, an EDC processing circuit 14, an ECC processing circuit 17, an internal memory control circuit 15, an internal RAM 16, and a DSP interface 18, which are configured on the same semiconductor substrate. The CD-ROM decoder 11 is connected to a buffer RAM 19. The CD-ROM decoder 11 and the buffer RAM 19 respectively correspond to the prior art CD-ROM decoder 1 and buffer RAM 7, which are shown in FIG. 1.

The host interface 12 is connected to a host computer 120 and functions as an interface between the CD-ROM decoder 11 and the host computer 120. The external memory control circuit 13 is connected to the buffer RAM 19 and controls the writing of CD-ROM data to the buffer RAM 19 and the reading of CD-ROM data from the buffer RAM 19.

The buffer RAM 19 is a recording medium to which the writing and reading of data is enabled, such as a static random access memory (SRAM), in accordance with a write address signal and a read address signal, which are generated by an address generation circuit 200 included in the external memory control circuit 13. Further, the buffer RAM 19 temporarily stores CD-ROM data, which includes multiple blocks and which is provided to the host interface 12 or the DSP interface 18. The EDC processing circuit 14 obtains an EDC parity (EDC(p)) during the recording of the CD-ROM data and detects code errors during the reproduction of the CD-ROM data. The ECC processing circuit 17 obtains an ECC (parity of P-code word and parity of Q-code word) when recording the CD-ROM data and corrects data code errors during reproduction of the CD-ROM data.

The internal memory control circuit 15 is connected to the internal RAM 16, which is incorporated in the CD-ROM decoder 11, and controls the writing of data to the internal RAM 16 and the reading of data from the internal RAM 16. The internal RAM 16 is a recording medium to which the writing and reading of data is enabled in the same manner as in the buffer RAM 19 in accordance with a write address signal and read address signal generated by an address generation circuit 220 included in the internal memory control circuit 15. The internal RAM 16 has a capacity that enables the storage of at least two blocks of the CD-ROM data. That is, in a normal CD-ROM format, a single block has 2352 bytes. Thus, the internal RAM 16 must have a capacity of 38 Kb or more.

The DSP interface 18, which is connected to a digital signal processor (DSP) 2, functions as an interface between the CD-ROM decoder 11 and the DSP 2.

Figure 4:
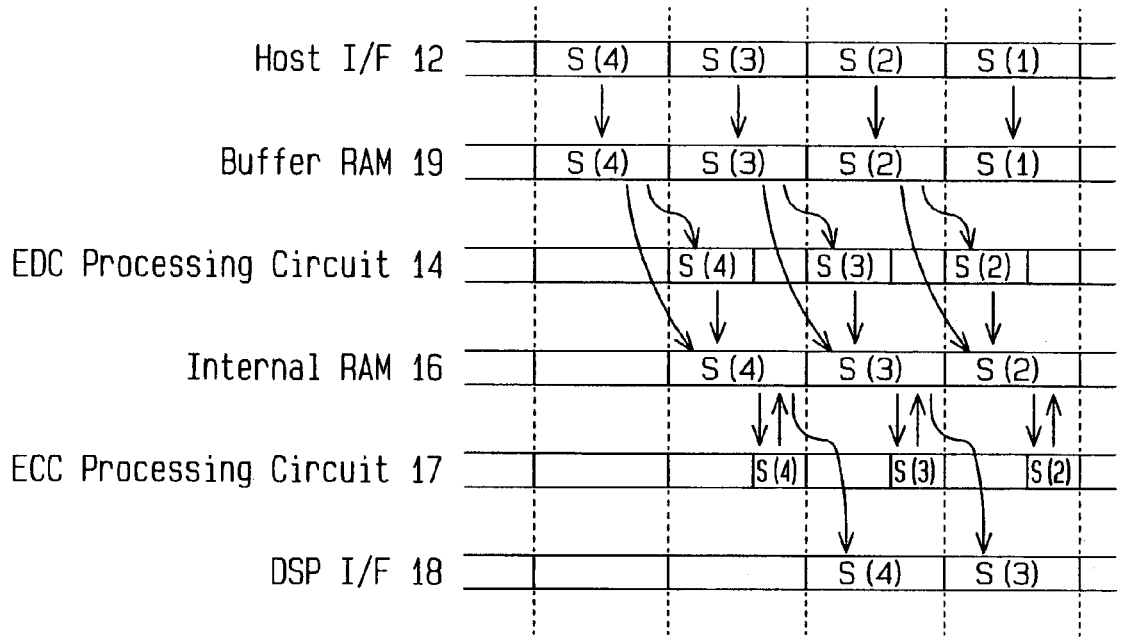
FIG. 4 is a timing chart illustrating the flow of data in the CD-ROM decoder of FIG. 3 when recording CD-ROM data.
Figure 5:
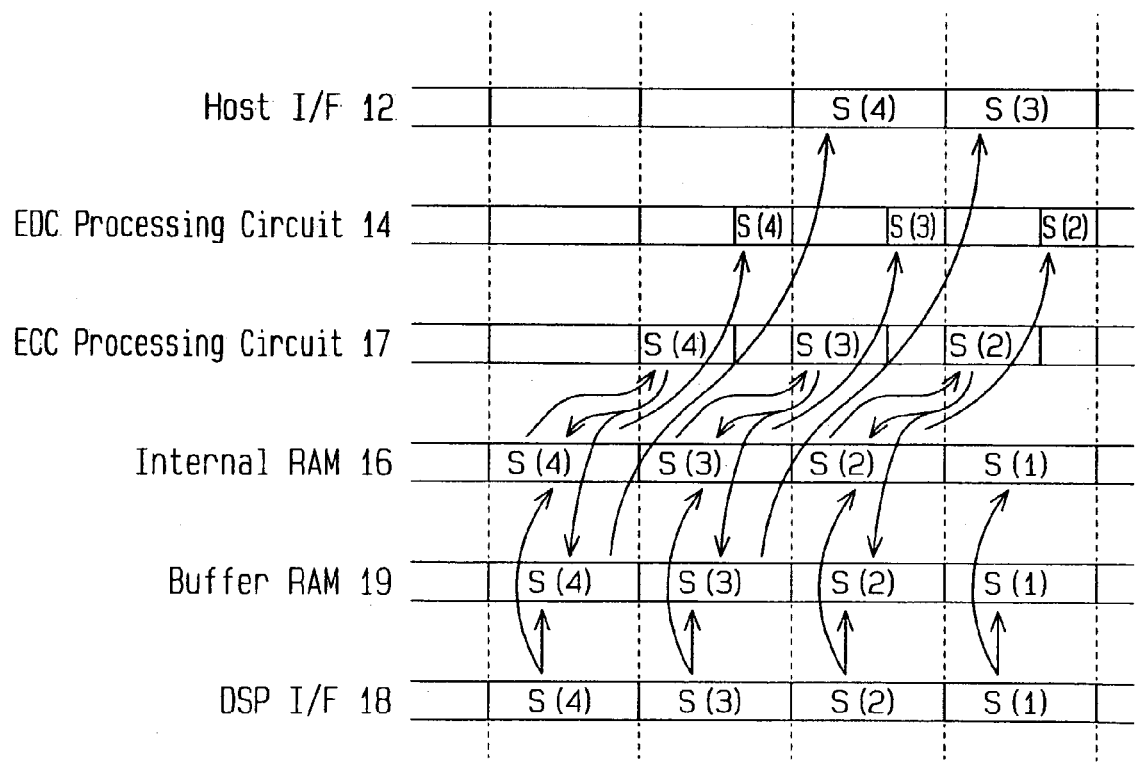
FIG. 5 is a timing chart illustrating the flow of data in the CD-ROM decoder of FIG. 3 when reproducing the CD-ROM data.

The operation of the CD-ROM decoder 11 will now be discussed with reference to FIGS. 4 and 5. FIG. 4 is a timing chart illustrating the flow of data in the CD-ROM decoder 11 during the recording of CD-ROM data. FIG. 5 is a timing chart illustrating the flow of data during the reproduction of the CD-ROM data.

The host computer 120 provides the host interface 12 with 2,048 bytes of data S(n) in single block units. The host interface 12 adds synchronization data (12 bytes) and header data (4 bytes) to the 2,048 bytes of data. The host interface 12 provides the external memory control circuit 13 with the data to which the synchronization data and header data have been added. The external memory control circuit 13 writes data to the buffer RAM 19.

Then, the external memory control circuit 13 reads CD-ROM data S(n) of block n from the data of the multiple blocks written to the buffer RAM 19. The internal memory control circuit 15 receives the read CD-ROM data S(n) from the external memory control circuit 13 and writes the CD-ROM data S(n) to the internal RAM 16. At the same time, the external memory control circuit 13 provides the CD-ROM data S(n) to the EDC processing circuit 14. The EDC processing circuit 14 performs an operation on the CD-ROM data S(n) to obtain the EDC(p) and provides the EDC(p) to the internal memory control circuit 15.

Figure 6:
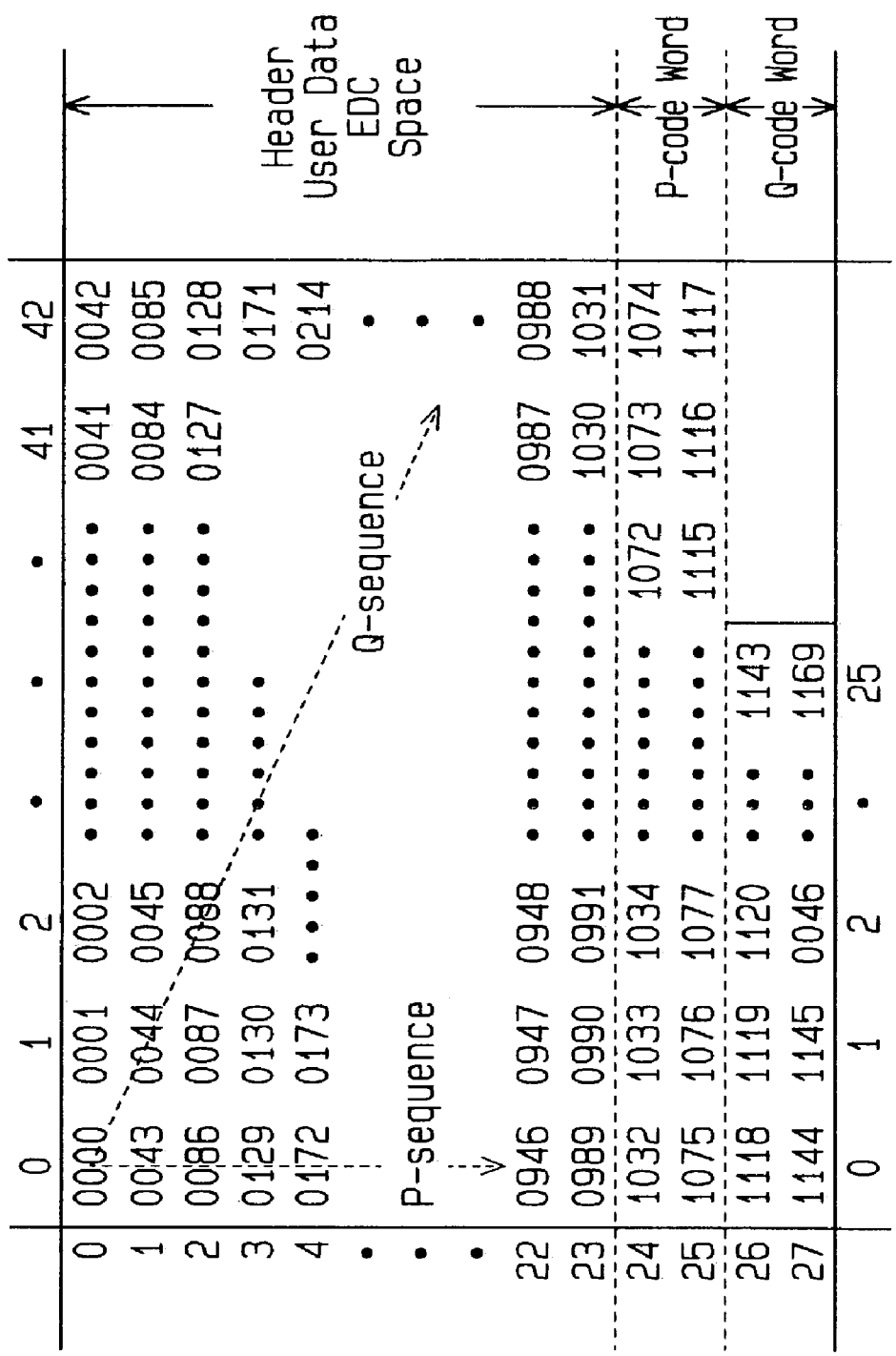
FIG. 6 is a chart illustrating an error correction code of the CD-ROM data.

The internal memory control circuit 15 writes the EDC obtained by the EDC processing circuit 14 to the internal RAM 16. In this state, the internal memory control circuit 15 writes the EDC to the internal RAM 16 to add the EDC to the CD-ROM data S(n) stored in the internal RAM 16. The internal memory control circuit 15 reads the CD-ROM data S(n), to which the EDC is added, from the internal RAM 16 and provides the CD-ROM data S(n) to the ECC processing circuit 17. The ECC processing circuit 17 obtains two systems of the ECC (P-code word and Q-code word) by performing a predetermined operation on the CD-ROM data S(n) to which the EDC has been added. Referring to FIG. 6, the CD-ROM data is separated into upper rank bytes and lower rank bytes to configure a plane having 1,032 pieces of symbol data. The P-code word is generated two at a time by processing every 24 pieces of the symbol data in accordance with a P-sequence. The Q-code word is generated two at a time by processing 43 pieces of the 1,032 pieces of symbol data in accordance with a Q-sequence.

The internal memory control circuit 15 writes the ECC obtained by the ECC processing circuit 17 to the internal RAM 16. In this state, the internal memory control circuit 15 stores the ECC in the internal RAM 16 so that the ECC is added to the CD-ROM data to which the EDC(p) has been added. The internal memory control circuit 15 reads the CD-ROM data, to which the EDC and the ECC have been added, from the internal RAM 16 and provides the CD-ROM data to the DSP interface 18. The DSP interface 18 provides the DSP 2 with the CD-ROM data, to which the EDC and the ECC have been added.

In the preferred embodiment, the buffer RAM 19 is used to the processes of receiving data from the host computer 120 and providing data to the EDC processing circuit 14. The internal RAM 16 is used to the processes from writing the EDC generated by the EDC processing circuit 14 to providing CD-ROM data to the DSP interface 18. Accordingly, even when data is being received from the host computer 120, the EDC processing circuit 14 obtains the EDC and the ECC processing circuit 17 obtains the ECC. Such parallel processing significantly reduces the time required for the series of processes to be performed by the CD-ROM decoder 11. As a result, the processing speed of the entire system is increased. In addition, the internal RAM 16 is configured on the same semiconductor substrate as the CD-ROM decoder 11. Thus, the internal RAM 16 increases the data transfer speed.

The CD-ROM decoder 11 accesses the buffer RAM 19 only when receiving data that is transferred from the host computer 120. This provides a margin for accessing the buffer RAM 19. As a result, in the buffer RAM 19, the capacity for coping with access requests from other processing circuits, such as the control microcomputer 8, increases.

The flow of data in the CD-ROM decoder 11 during reproduction of the CD-ROM data will now be described with reference to FIG. 5. The DSP interface 18 receives data S(n) one block at a time from the DSP 2 and provides the data S(n) to the internal memory control circuit 15 and the external memory control circuit 13. The internal memory control circuit 15 stores data in the internal RAM 16. The external memory control circuit 13 stores data in the buffer RAM 19. The data S(n) stored in the internal RAM 16 is read from the internal RAM 16 and provided to the ECC processing circuit 17 when the next data S(n+1) is received. The ECC processing circuit 17 corrects code errors, which is based on the ECC added during the recording of data, in the data S(n). As a result of the correction process, if there is an error in the data S(n), the erroneous section of the data S(n) is re-written to correct the data. The re-writing is performed simultaneously on the CD-ROM data stored in the internal RAM 16 and the CD-ROM data stored in the buffer RAM 19.

The internal memory control circuit 15 reads data S(n), which has undergone the correction process, from the internal RAM 16 and provides the data S(n) to the EDC processing circuit 14. The EDC processing circuit 14 detects whether there are code errors in the data S(n) by performing operations based on the EDC added during the recording of data. Since the EDC processing circuit 14 does not have a function for correcting errors, the EDC processing circuit 14 adds an error flag to the CD-ROM data when detecting a code error.

The providing of data S(n) to the ECC processing circuit 17 and the EDC processing circuit 14 are completed during a period in which the next data S(n+1) is received from the DSP 2 (single block period). The host interface 12 sequentially provides the data S(n) stored in the buffer RAM 19 to the host computer 120 in response to a request from the host computer 120.

In the preferred embodiment, the correction and detection of code error in the CD-ROM data is divided between the buffer RAM 19 and the internal RAM 16. Thus, the accessing of the buffer RAM 19 is suspended when data is provided from the internal RAM 16 to the ECC processing circuit 17 or the EDC processing circuit 14. The timing for transferring the CD-ROM data to the host computer 120 may be set within a wide range by using the access suspension period. This increases the transfer speed of the CD-ROM data and is thus preferable when, for example, performing double speed reproduction.

Figure 7:
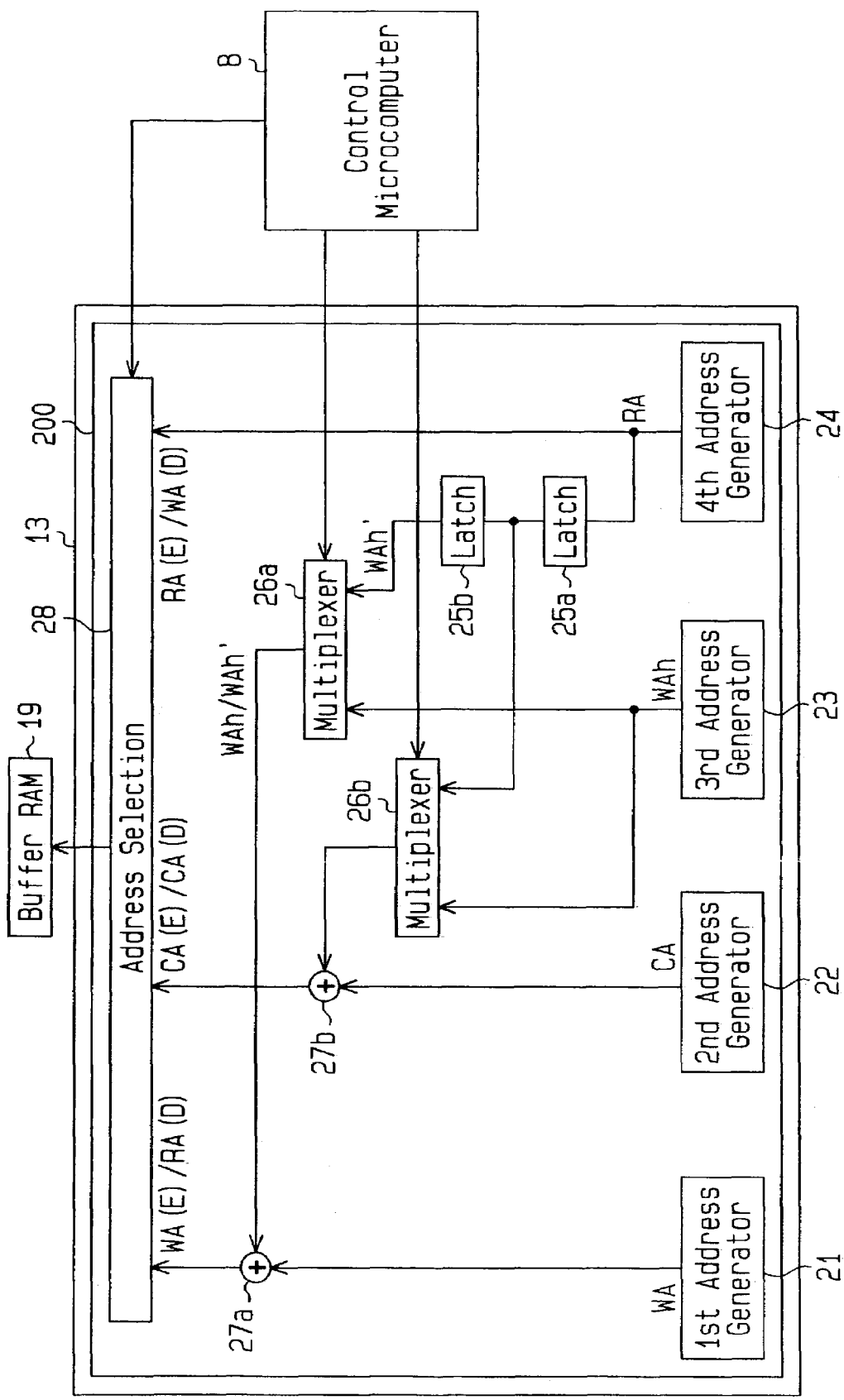
FIG. 7 is a schematic block diagram of an address generation circuit connected to the CD-ROM decoder of FIG. 3.

FIG. 7 is a schematic block diagram of the address generation circuit 200, which provides the buffer RAM 19 with a write address signal and a read address signal. The address generation circuit 220, which provides the internal RAM 16 with a write address signal and a read address signal, has the same configuration as the address generation circuit 200 and is thus not shown in FIG. 7. The address generation circuits 200 and 220 are included in the buffer RAM 19 and the internal RAM 16, respectively, and configured on the same semiconductor substrate as the CD-ROM decoder 11.

The address generation circuit 200 includes four address generators 21, 22, 23, and 24, two latches 25a and 25b, two multiplexers 26a and 26b, two adders 27a and 27b, and an address selection section 28. The first address generator 21 generates an address signal WA that is sequentially incremented to designate a predetermined section in a single block that is defined in the data recording section of the RAM. The second address generator 22 generates an address signal CA for designating predetermined sections in a single block in an inherent order that corresponds to the error correction process and the error detection process. The third address generator 23 generates a head address signal WAh, which indicates the head address of a single block in the data recording section. The fourth address generator 24 generates an address signal RA, which is used to sequentially designate address 0 to the final address in accordance with a predetermined order in the data recording section.

Among the address signals RA that are consecutively output from the fourth address generator 24, for each block unit, the latches 25a and 25b each latches the address signal that indicates the head address in the section corresponding to the single block.

The multiplexer 26a receives the head address signal WAh and the output signal of the latch 25b. Then, the multiplexer 26a selects either one of the signals in accordance with a command from the control microcomputer 8, which controls the operation of the entire CD-ROM decoder. The multiplexer 26b receives the head address signal WAh and the output signal of the latch 25b. Then, the multiplexer 26b selects either one of the signals in accordance with a command from the control microcomputer 8.

The adder 27a adds the output signal (head address) of the multiplexer 26a to the address signal WA to generate an address signal. The adder 27b adds the output signal (head address) of the multiplexer 26b to the address signal CA to generate an address signal.

The address selection section 28 receives the address signals of the adders 27a and 27b and the address signal RA. Then, the address selection section 28 selects one of the address signals and provides the selected signal to the buffer RAM 19 or the internal RAM 16 as an access address. The address selection section 28 is connected to the control microcomputer 8. Under the control of the control microcomputer 8, the address selection section 28 selects an access address in accordance with various processes, such as the receiving of data from the host computer 120 and the error correction process.

The operations of the address generation circuits 200, 220 when recording CD-ROM data will now be discussed with reference to FIGS. 8A and 8B. FIGS. 8A and 8B are schematic diagrams illustrating the operations of the buffer RAM 19 and the internal RAM 16 during the recording of data. In the CD-ROM decoder 11, various processes are performed on multiple blocks in a parallel and time-divisional manner. A case in which the data receipt of block n+1 from the host computer 120, the data error correction of block n, and the data output of block n−1 to the DSP 2 are performed in parallel will now be discussed.

[Receipt of Data S(n+1)]

When the data S(n+1) of block n+1 is transferred from the host computer 120 to the CD-ROM decoder 11, the data S(n+1) is stored in the buffer RAM 19 at a section allocated to block n+1. In this state, the multiplexer 26a of the address generation circuit 200 selects the head address WAh, and the adder 27a adds the head address signal WAh to the address signal WA to generate a write address signal WA(E). That is, the write address signal WA(E) is generated by adding the head address of the section to which the block n+1 is allocated to the address signal WA, which sequentially designates predetermined sections in the section of a single block. Accordingly, as shown in FIG. 8A, the write address signal WA(E) sequentially designates memory sections allocated to block n+1. The address selection section 28 selects the write address signal WA(E) and stores the data S(n+1) in predetermined sections of the buffer RAM 19 in accordance with the write address signal WA(E).

In the CD-ROM decoder 11, the error correction of data S(n) in block n and the data output to the internal RAM 16 are performed parallel to the receipt of the data S(n+1).

[Error Correction of Data S(n)]

The multiplexer 26b of the address generation circuit 200 selects the head address signal WAh. The adder 27b adds the head address signal WAh to the address signal CA to generate a correction address signal CA(E). The correction address signal CA(E) is generated by adding the address signal WAh, which indicates the head address of the section allocated to block n, to the address signal CA, which designates predetermined sections in a single block in an inherent order that corresponds to the error correction process. Accordingly, as shown in FIG. 8A, the correction address signal CA(E) designates addresses of the memory section allocated to block n in an inherent order. The address selection section 28 selects the correction address signal CA(E) and performs error correction on the data of block n.

[Data Output to Internal RAM 16]

The address selection section 28 of the address generation circuit 200 selects the address signal RA. The address signal RA is provided to the buffer RAM 19 as a read address signal RA(E). The data S(n) stored in the section for block n is read from the buffer RAM 19 and provided to the internal RAM 16.

In the CD-ROM decoder 11, the writing of data S(n) to the internal RAM 16, the error correction of data S(n), and the output of data S(n−1) are performed parallel to the output of data S(n) from the buffer RAM 19.

[Writing of Data S(n)]

The address selection section 28 of the address generation circuit 220 selects the address signal WA(E) that is generated by adding the head address signal WAh, which is selected by the multiplexer 26a, to the address signal WA. Then, the address selection section 28 provides the address signal WA(E) to the internal RAM 16.

During the error correction of data S(n), the address selection section 28 selects the correction address signal CA(E)that is generated by adding the address signal WAh, which is selected by the multiplexer 26b, to the address signal CA. Then, the address selection section 28 provides the correction address signal CA(E) to the internal RAM 16 as an access address.

[Output of Data S(n−1)]

The address selection section 28 selects the address signal RA and provides the address signal RA(E) to the internal RAM 16. The address selection section 28 selects the write address signal WA(E), the correction address signal CA(E), and the read address signal RA(E) in a parallel and time-divisional manner.

The operation of the address generation circuits during data reproduction in the CD-ROM decoder 11 will now be discussed with reference to FIGS. 9A and 9B. FIGS. 9A and 9B are schematic diagrams illustrating the operations of the internal RAM 16 and the buffer RAM 19 during the reproduction of data. In the CD-ROM decoder 11, various processes are also performed on multiple blocks in a parallel and time-divisional manner during data reproduction. A case in which the data receipt of block n+1 from the DSP 2, the data error correction of block n, and the data output of block n−1 to host computer 120 are performed in parallel will now be discussed.

[Receipt of Data of Block n+1]

The DSP 2 transfers the data S(n+1) of block n+1 to the CD-ROM decoder 11. The data S(n+1) is stored in the buffer RAM 19 and the internal RAM 16. In this state, each address selection section 28 of the address generation circuits 200 and 220 selects the address signal RA and provides the corresponding RAM with a write address WA(D). The input data S(n+1) is sequentially written to the section next to the section in which the data S(n) of block n is written to in the buffer RAM 19 and the internal RAM 16.

In the CD-ROM decoder 11, the error correction of data S(n) in block n with the buffer RAM 19 and the internal RAM 16 (i.e., the correction and detection of code errors) is performed parallel to the receipt of the data S(n+1).

[Error Correction of Data S(n)]

Each multiplexer 26a of the address generation circuits 200 and 220 selects the output signal of the latch 25b. The adder 27b adds the output signal of the latch 25b to the address signal CA to generate a correction address signal CA(D). The correction address signal CA(D) is generated by adding an output signal WAh' of the latch 25b, which indicates the head address data S(n) of block n, to the address signal CA, which designates predetermined sections in a single block in a certain order. Accordingly, as shown in FIGS. 9A and 9B, the correction address signal CA(D) designates addresses of the section in which the data S(n) of block n is recorded. The address selection section 28 selects the correction address signal CA(E) and provides the buffer RAM 19 and the internal RAM 16 with the correction address signal CA(E) as the access address.

In the CD-ROM decoder 11, the output of the data S(n−1) of block n−1 with the internal RAM 16 is performed parallel to the error correction of data S(n).

[Output of Data S(n−1)]

The multiplexer 26a of the address generation circuit 220 selects the output signal of the latch 25b. The adder 27a adds the output signal of the latch 25b to the address signal WA to generate a read address signal RA(D). The read address signal RA(D) is generated by adding the output signal WAh' of the latch 25b, which indicates the head address of the data S(n−1) that is two blocks in front of data S(n+1), to the address signal WA, which sequentially designates predetermined sections in a single block.

Accordingly, as shown in FIG. 9B, the read address signal RA(D) sequentially designates the storage section of block n−1. The address selection section 28 selects the read signal RA(D) and provides the internal RAM 16 with the read signal RA(D) as an access address. In this manner, the data S(n−1) stored in the internal RAM 16 is provided to the host computer 120 in accordance with the access address.

It should be apparent to those skilled in the art that the present invention may be embodied in many other specific forms without departing from the spirit or scope of the invention. Particularly, it should be understood that the present invention may be embodied in the following forms.

The application of the present invention is not limited to a CD-R/RW system and may also be applied to any system that uses a data writable recording medium, such as a DVD-R.

The present examples and embodiments are to be considered as illustrative and not restrictive, and the invention is not to be limited to the details given herein, but may be modified within the scope and equivalence of the appended claims.

What is claimed is:

1. A data processor for processing digital data while buffering the digital data in a buffer memory, the data processor comprising:
a first interface which stores the digital data in the buffer memory;
a detection code processing circuit which receives the digital data when read from the buffer memory in a block unit and which generates an error detection code, wherein the detection code processing circuit adds the error detection code to the read digital data;
a correction code processing circuit which generates an error correction code with the digital data and the error code, wherein the correction code processing circuit adds the error correction code to the digital data;
an internal memory circuit which stores the digital data, the error detection code and the error correction code with the error detection code and the error correction code are added to the digital data; and
a second interface which outputs the digital data, to which the error detection code and the error correction code are added, stored in the internal memory circuit in a block unit.

2. The data processor according to claim 1, wherein the internal memory circuit stores the error detection code generated by the detection code processing circuit so that the error detection code is added to the digital data, and stores the error correction code generated by the correction code processing circuit so that the error correction code is added to the digital data to which the error detection code is added.

3. The data processor according to claim 1, wherein the second interface provides the digital data, to which the error correction code and the error detection code are added, to the buffer memory and the internal memory circuit in a block unit, the correction code processing circuit performs an error correction process on the digital data read from the internal memory circuit and provides the correction process result to the internal memory circuit and the buffer memory, the detection code processing circuit performs an error detection process on the digital data, which is read from the internal memory circuit and has undergone the error correction process, and the first interface outputs the digital data, which is stored in the buffer memory and which has undergone the error correction process and the error detection process, in a block unit.

4. The data processor according to claim 3, wherein the correction code processing circuit corrects an error of the digital data, which is stored in the internal memory circuit and the buffer memory, based on the correction process result.

5. The data processor according to claim 4, wherein the first interface outputs the digital data that is stored in the buffer memory and has undergone the error correction process and the error detection process when the correction code processing circuit is correcting the error of the digital data that is stored in the internal memory circuit.

6. The data processor according to claim 1, further comprising:
an external memory control circuit connected to the buffer memory, the first interface and the detection code processing circuit to control transfer of the digital data between the buffer memory and the first interface or the detection code processing circuit; and
an internal memory control circuit connected between the internal memory circuit and the second interface to control transfer of the digital data, to which the error detection code and the error correction code are added, between the internal memory circuit and the second interface.

7. The data processor according to claim 1, wherein the internal memory circuit has a capacity for storing at least two blocks of the digital data.

8. A method for processing digital data while buffering the digital data in a buffer memory, the method comprising:
storing the digital data in the buffer memory;
reading the digital data from the buffer memory in a block unit and generating an error detection code to add the error detection code to the read digital data;
generating an error correction code with the digital data and the error detection code to add the error correction code to the digital data;

storing the digital data, the error detection code and the error correction code in an internal memory circuit with the error detection code and the error correction code are added to the digital data; and outputting the digital data, to which the error detection code and the error correction code are added, stored in the internal memory circuit.

9. The method according to claim 8, wherein said storing the digital data in an internal memory circuit includes:

storing the error detection code in the internal memory circuit so that the error detection code is added to the digital data; and storing the error correction code in the internal memory circuit so that the error correction code is added to the digital data to which the error detection code is added.

10. The method according to claim 8, further comprising:

providing the digital data, to which the error correction code and the error detection code are added, to the buffer memory and the internal memory circuit;

performing an error correction process on the digital data read from the internal memory circuit and providing the correction process result to the internal memory circuit and the buffer memory;

performing a correction detection process on the digital data, which is read from the internal memory circuit and has undergone the error correction process; and outputting the digital data, which is stored in the buffer memory and which has undergone the error correction process and the error detection process.

11. The method according to claim 10, wherein said performing an error correction process on the digital data includes correcting an error of the digital data, which is stored in the internal memory circuit and the buffer memory, based on the correction process result.

* * * * *